United States Patent [19]

Ripol et al.

[11] Patent Number: 5,401,209
[45] Date of Patent: Mar. 28, 1995

[54] CURRENT REGULATED ELECTRONIC STUNNING APPARATUS

[76] Inventors: George J. Ripol, 9000 Weems Rd., Manassas, Va. 22110; Samuel C. Yakulis, 8644 Point of Woods Dr., Manassas, Va. 22110-6319; Forrest K. Smith, 13134 Carriage Ford Rd., Nokesville, Va. 22123; George K. Woodworth, 4800 Catharpin Rd., Gainesville, Va. 22065; Craig D. Peterson, 16001 Arden Ct., Woodbridge, Va. 22191

[21] Appl. No.: 156,548

[22] Filed: Nov. 23, 1993

Related U.S. Application Data

[63] Continuation-in-part of Ser. No. 4,017, Jan. 15, 1993, Pat. No. 5,306,200.

[51] Int. Cl.⁶ .................................................. A22B 3/06
[52] U.S. Cl. ............................................ 452/58; 452/59
[58] Field of Search .............................. 452/58, 57, 59

[56] References Cited

U.S. PATENT DOCUMENTS

| | | | |
|---|---|---|---|
| 2,103,288 | 12/1937 | Hunt | 452/58 |
| 2,306,773 | 12/1942 | Biffinger | 452/58 |
| 2,621,362 | 12/1952 | Cosden | 452/58 |
| 2,879,539 | 3/1959 | Cervin | 452/58 |
| 3,012,271 | 12/1961 | Morse | 452/58 |
| 3,314,102 | 4/1967 | Rains | 452/58 |
| 3,474,490 | 10/1969 | Groover et al. | 452/58 |
| 3,555,594 | 1/1971 | Groover et al. | 452/59 |
| 3,564,645 | 2/1971 | Brugman | 452/59 |
| 3,571,845 | 3/1971 | Martin | 452/58 |
| 3,702,017 | 11/1972 | Lewis | 452/58 |
| 3,828,397 | 8/1974 | Harben | 452/58 |
| 3,833,966 | 9/1974 | Harben | 452/58 |
| 3,857,138 | 12/1974 | McWhirter | 452/58 |
| 3,918,123 | 11/1975 | Harben | 452/58 |
| 3,981,045 | 9/1976 | Collins | 452/58 |
| 4,092,761 | 6/1978 | McWhirter | 452/58 |
| 4,153,971 | 5/1979 | Simonds | 452/58 |
| 4,694,534 | 9/1987 | Simmons | 452/58 |
| 4,751,767 | 6/1988 | Walther | 452/58 |
| 4,875,253 | 10/1989 | Lambooy | 452/58 |
| 5,306,200 | 4/1994 | Ripol et al. | 452/59 |

FOREIGN PATENT DOCUMENTS

| | | |
|---|---|---|
| 673927 | 11/1963 | Canada . |
| 681084 | 3/1964 | Canada . |
| 1267687 | 4/1990 | Canada . |
| 060527 | 9/1982 | European Pat. Off. . |
| 32 33 372 | 3/1994 | Germany . |
| 1123300 | 8/1968 | United Kingdom . |

OTHER PUBLICATIONS

Bilgili, Electrical Stunning of Broilers—Basic Concepts and Carcass Quality Implications, 1992 J. Appl. Poultry Res: 1:135–146.

Grandin, Cardiac Arrest Stunning of Livestock and Poultry, Advances in Animal Welfare Science, Fox & Mickley (Eds), pp. 1–30.

Sparrey, et al., Model of Current Pathways in Electrical Water Bath Stunners Used for Poultry; 1992, British Poultry Science, 33:907–916.

*Primary Examiner*—Willis Little
*Attorney, Agent, or Firm*—Kirkpatrick & Lockhart

[57] ABSTRACT

An apparatus for stunning poultry has a conveyor moving along a predetermined path, for suspending the poultry and a compartmentalized basin defining individual compartments for a conducting liquid. The basin is positioned below a portion of the conveyor. A circuit impresses a voltage across the conveyor and each of the individual compartments. The voltages are a function of the position of each of the compartments relative to the conveyor. The voltages are variable so as to produce a current regulated signal flowing between the conveyor and each of the individual compartments when the poultry is in contact with the conducting liquid in any of the individual compartments.

7 Claims, 12 Drawing Sheets

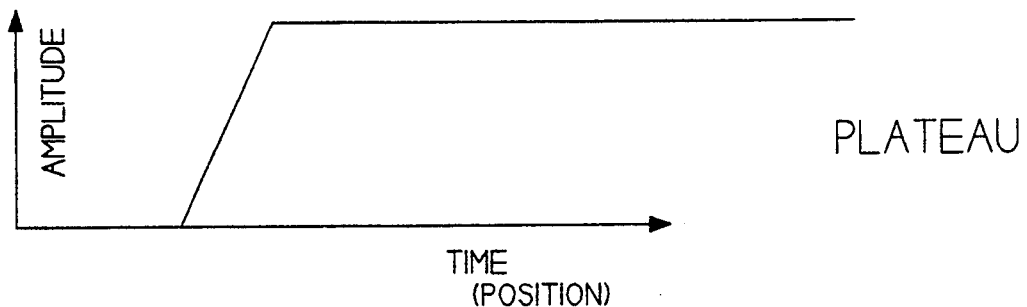
Fig.4A. PLATEAU
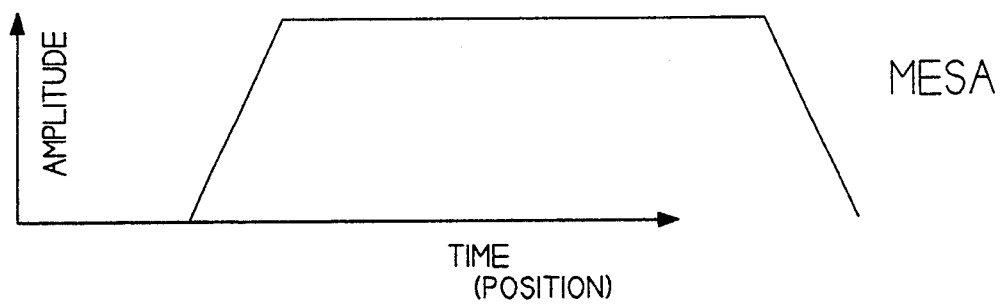
Fig.4B. MESA
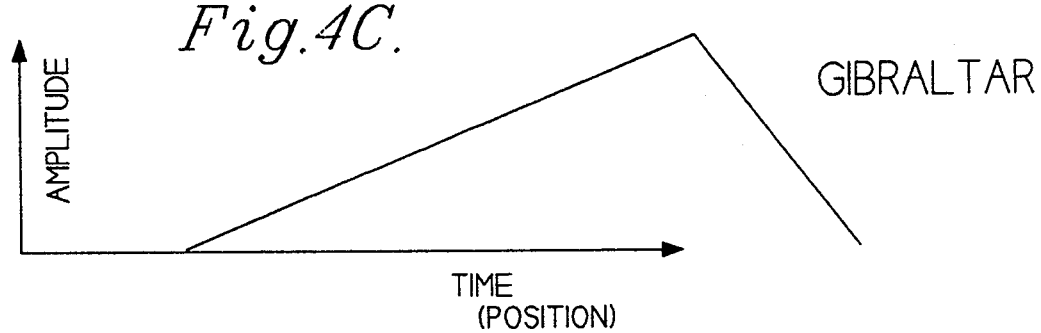
Fig.4C. GIBRALTAR
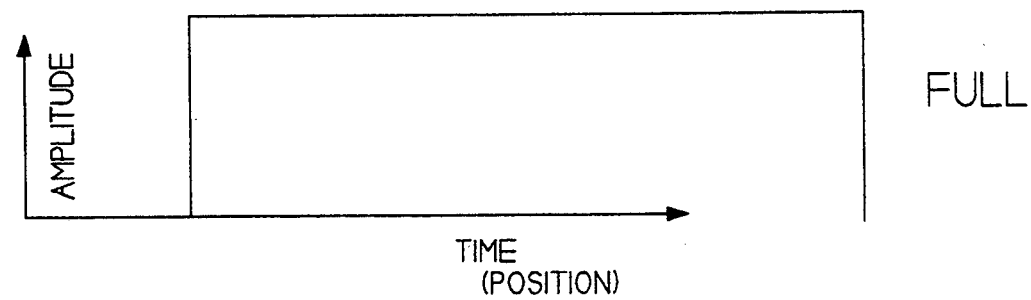
Fig.4D. FULL

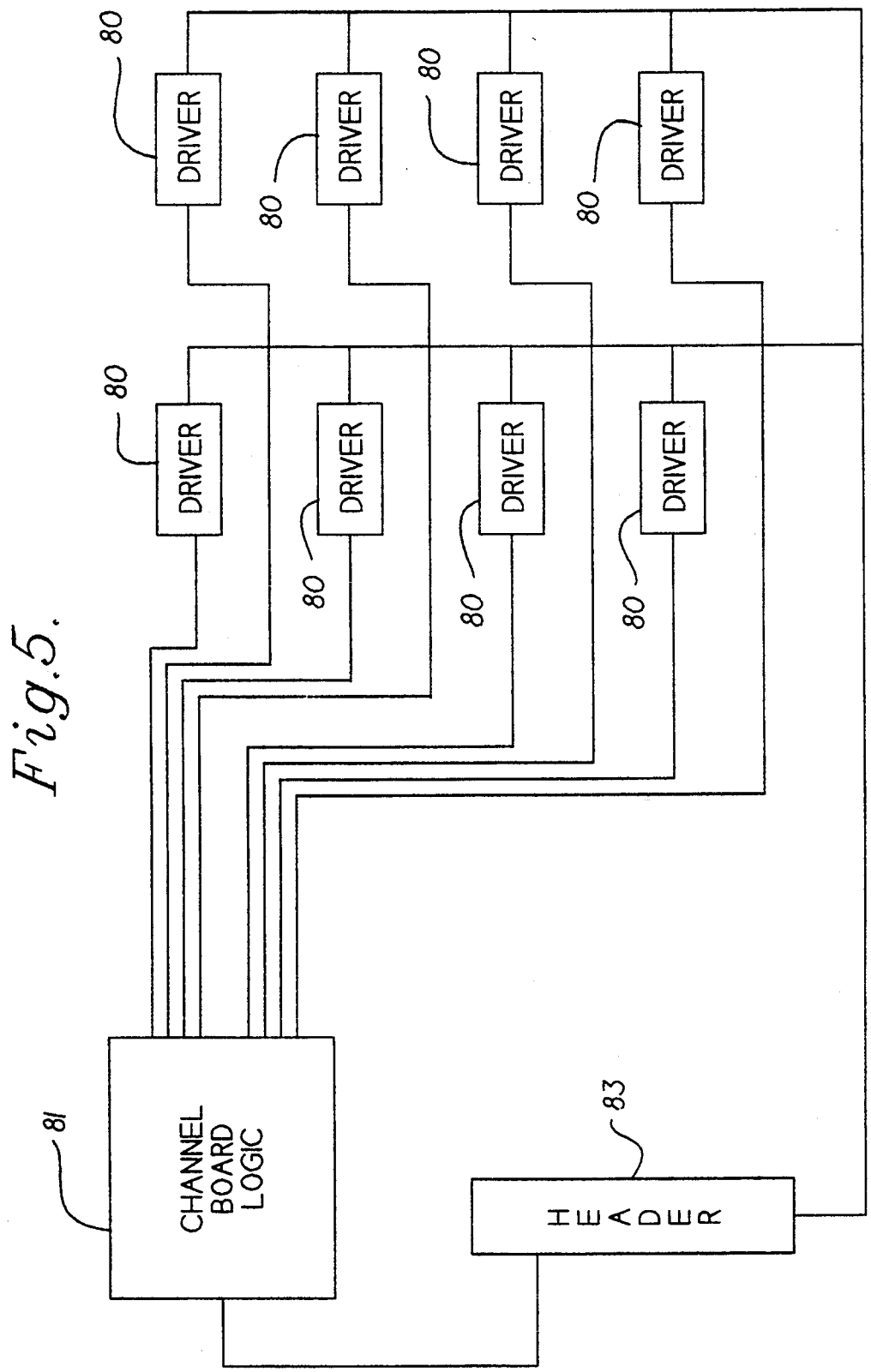

CURRENT REGULATED ELECTRONIC STUNNING APPARATUS

This is a continuation-in-part of U.S. patent application Ser. No. 08/004,017, filed Jan. 15, 1993, now U.S. Pat. No. 5,360,200.

BACKGROUND OF THE INVENTION

1. Field of the Invention

The present invention is directed generally to a process and apparatus for electrically stunning poultry, and more specifically, to an apparatus incorporating a microprocessor based, current regulated output electrical circuit for the precise, individually controlled electronic stunning of poultry.

2. Description of the Background of the Invention

Poultry production has been a rapidly growing industry over the last twenty years. In the United States, it has been estimated that broiler chicken liveweight production was over 550 million pounds per week in 1992 while annual turkey liveweight production exceeded 6 billion pounds in 1990. It is further estimated that the national average of broiler undergrades in 1988 was approximately forty-six percent, translating to losses to the industry of hundreds of millions dollars for that year alone. Thus, even in such a mature industry, there is significant room for technological advances which improve the quality of the process. While the invention described herein has applications in other livestock processing, including hog processing, by way of example only, the present invention and the description of the background thereof will be described as it relates to the poultry industry.

During production, several factors contribute to the downgrading of the poultry. Such factors include the breed and strain of the poultry, the environment and management of the operation, nutrition, live handling, and processing, with the majority of downgrades caused by live handling, including live receiving and hanging of the birds, and the subsequent processing.

In the live handling and processing of poultry, it is a generally accepted practice in the industry that the animals be rendered unconscious by an electric current (electronarcosis) prior to slaughter. The stunning process relaxes the animals as they enter the slaughter mechanism. The slaughter mechanism typically comprises a form of mechanical knife that slits the blood vessels in the neck. Thereafter, the animals require a certain bleed out time during which they expire due to blood loss.

In a conventional processing line, the animals are initially hung on metal shackles by their feet. Those shackles are connected to each other, forming a conveyor line along a horizontal track which moves the poultry through the processing plant. The shackles and associated conveyor hardware are typically constructed of a conductive material and tied to an electrical ground. Thus, the shackles serve the additional purpose of providing an electrical ground during the stunning process. The heads, and optionally, the shoulders of the poultry are passed through a bath of a conductive liquid which is electrically charged. Once in the bath, the animals complete the circuit, providing a path for the current to pass from the charged bath to ground potential, such path preferably passing through the animal's brain.

The ability to obtain a consistent stun is critical to the processing of poultry. If the stun is too harsh, blood vessels may burst, causing unsightly hemorrhaging or causing bones to shatter. Further, the electric stun may actually kill the bird which may affect the amount of total bleed out. If the stun is too light, the animal may revive early in the kill or bleed out cycle and the violent thrashing pursuant to such revival may cause similar damage and hemorrhaging in the wing tips. In each case, expensive hand carving is required and the meat must be downgraded. It is estimated that upwards of ten percent of the birds sustain some form of stun damage.

Previous research has focused on certain parameters of the stun process. For example, with respect to the bath, saline concentration at one percent is generally considered to be optimum. However, water has been shown to be effective as well. Further, it is critical that the animals remain in contact with the bath. To achieve better contact, rub bars have been developed which prevent an animal from lifting up when it feels the charge. U.S. Pat. No. 4,751,767 to Walther is directed to a bubbler which lifts the level of the saline solution in the vicinity of each animal's head to provide better contact. The use of a foot fogger to dampen the animals feet to provide better contact has been recommended.

The teachings of the art vary with respect to the optimum charge which should be applied. Some 60 Hz AC systems are believed to be too harsh on the birds. Typically, a 400 Hz, 115 V, 11–50 ma AC signal, or alternatively, a 1000 Hz pulsed DC signal, may be used. A major manufacturer of stunning equipment, in its technical literature, indicates that stunning is a function of power and time and recommends a type of trial and error procedure to set the proper charge, indicating that most processing plants can operate its stunner at 20–25 V DC with 200–400 ma applied to the bath containing multiple birds. The one common factor in the industry is that the stunning charge is applied using a constant voltage source. Therein lies a major problem with the state of the art for it is widely believed that it is the amperage (current) which induces unconsciousness in the birds during stunning and it is the voltage which provides the pressure to push the current through the bird.

In a typical broiler processing plant, the birds are stunned for seven to ten seconds, with fourteen to twenty birds in the bath at any one time. With the shackles only six inches apart, a new entry into the bath or an exit from the bath occurs every half second. Additionally, as will be further detailed herein, the impedance/resistance of a bird varies from bird to bird and, in fact, varies over time during the stun cycle.

To describe that process in electrical terms, a parallel electrical circuit is formed with up to twenty individual resistors present, each with varying resistive values, at any one time. Depending on the quantity and particular mix of birds ("resistors") in the bath at any one time, the stunning current applied to each bird varies significantly. This results in some individual birds being understunned while others are overstunned, causing extensive damage as described above. Further, should the bath contain fewer than the typical fourteen to twenty birds, the birds that are in the bath will be severely overstunned.

Cardiac arrest stunning differs from the electronarcosis described above in that the poultry is killed by the electrical circuit rather than such poultry merely being stunned. In a 1989 paper on cardiac arrest stunning, Grandin recommends the use of a constant current power source to induce cardiac arrest. While Grandin recognizes that the resistance from bird to bird may differ, she does not teach of the varying resistance of each bird over time during the stunning cycle. Further, Grandin does not solve the parallel circuit electrical problem identified above, recommending instead that a large total current be supplied such that the average current per bird after the total current is divided across the parallel circuit should be sufficient for inducing cardiac arrest.

With respect to other problems in the prior art, electrical malfunctions of any of the commercial processing systems may cause either inefficient operation or result in expensive down time while repairs are performed. It is further noted that none of the current systems have a reliable self-test capability and an automatic "hot" spare back-up stunning circuit available therein.

Thus, the need exists for a stunning apparatus which overcomes those and other problems associated with the present systems which improves both productivity and quality. Such a stunning apparatus should be capable of delivering a current regulated output signal sufficient to effectively stun each bird during the entire stun cycle, regardless of the number of birds being processed at the time. Further, the need exists for a stunning apparatus which may adopt its regulated current output to the particular profile of the bird being processed. Still further, the need exists for such an apparatus to have a real-time self-test and fault tolerance capability. The apparatus must be modular and adaptable to processing lines already in use to avoid extensive and expensive rework of such lines. Finally, the apparatus must minimize the amount of moving parts in a slaughter house to facilitate maintenance and reliability.

SUMMARY OF THE INVENTION

It is an object of the present invention to provide a process and apparatus whereby the optimum stun to each animal may be applied, individually and independently, by measuring some parameter of the animal, for example, the resistance/impedance, in real time and adjusting the stunning current in response thereto. Thus, differences in size, sex, breed, as well as external conditions, may be compensated for by the stunning process. It is a further object of the present invention to provide a current regulated stunning apparatus which is capable of providing the optimum stun to each animal individually and independently of other animals in the stunning unit.

Accordingly, the present invention overcomes those and other problems by providing an apparatus for stunning poultry comprising a conveyor for suspending the poultry wherein the conveyor moves along a predetermined path. A compartmentalized basin defining individual compartments for a conducting liquid is provided wherein the basin is positioned below a portion of the conveyor and moves at the same speed as the conveyor. Further, a position sensor for sensing the position of each of the compartments relative to a reference point and a circuit, responsive to the position sensor, for impressing a voltage across the conveyor and each of the individual compartments, are provided, wherein the voltages are a function of the position of each of the compartments. According to a preferred embodiment of the invention, the voltages are variable so as to produce a current regulated signal through the conveyor and each of the individual compartments when the poultry is in contact with the conducting liquid in any of the individual compartments. Further, according to one embodiment, the circuit for impressing a voltage includes a circuit for energizing individual compartments and a circuit for grounding the conveyor. According to an alternative embodiment, the circuit for impressing a voltage includes a circuit for energizing a shackle insulated from the rail (ground) or alternatively, the leg, and a circuit for grounding the individual compartments, or alternatively, a common bath. The present invention may further provide a test pod associated with one of the positions, wherein the test pod includes a conductive member positioned at a test position such that the conductive member is in electrical contact with each of the individual compartments when each of the individual compartments is located at that test position. The present invention further provides a circuit for impressing a voltage which includes a back-up circuit for supplying back-up voltages, and a switch for selecting between the voltages or the back-up voltages to be impressed across said conveyor and the individual compartments.

According to another embodiment of the present invention, an apparatus for stunning animals is provided comprising a conveyor for suspending the animals moving along a predetermined path, a compartmentalized basin defining individual compartments for a conducting liquid wherein each of the individual compartments is electrically isolated from other individual compartments, and wherein the basin is positioned below a portion of the conveyor, and a circuit for impressing a voltage across the conveyor and each of the individual compartments, the voltages being a function of the position of each of the individual compartments relative to the conveyor.

According to yet another embodiment of the present invention, an apparatus for stunning animals is provided comprising a conveyor for suspending the animals moving along a predetermined path, a contact strip applied to a portion of each animal, a conducting strip defining individual segments positioned adjacent a portion of the conveyor wherein the contact strip forms an electrical connection with the conducting strip when the conveyor is moving adjacent the conducting strip, and a circuit for impressing a voltage across the conveyor and each of the individual segments, the voltages being a function of the position of each of the individual segments relative to the conveyor.

Accordingly, the present invention overcomes the problems associated with the present stun systems and thereby provides a means to improve both the efficiency and the quality of poultry processing. The present invention delivers a regulated current output signal sufficient to effectively stun each bird during the entire stun cycle, regardless of the number of birds being processed at the time. Further, the present invention can regulate its output signal to accommodate the particular profile of the signal required for each type of bird being processed. The present invention provides a real-time self test and fault tolerance capability to avoid inefficient operation and down-time. Finally, the present invention is adaptable for use in processing lines presently in existence. Alternative embodiments are presented which minimize the number of moving parts of the present invention. These and other advantages and benefits of the present invention will become apparent from the description of the preferred embodiment hereinbelow.

BRIEF DESCRIPTION OF THE DRAWINGS

For the present invention to be clearly understood and readily practiced, preferred embodiments will now be described, by way of example only, with reference to the accompanying figures wherein:

FIGS. 4A through 4D are illustrations of four typical profiles generated by the signal generator;

FIG. 5 is a board level schematic diagram of the channel card shown in FIG. 2;

DETAILED DESCRIPTION OF THE PREFERRED EMBODIMENT

Figure 1:
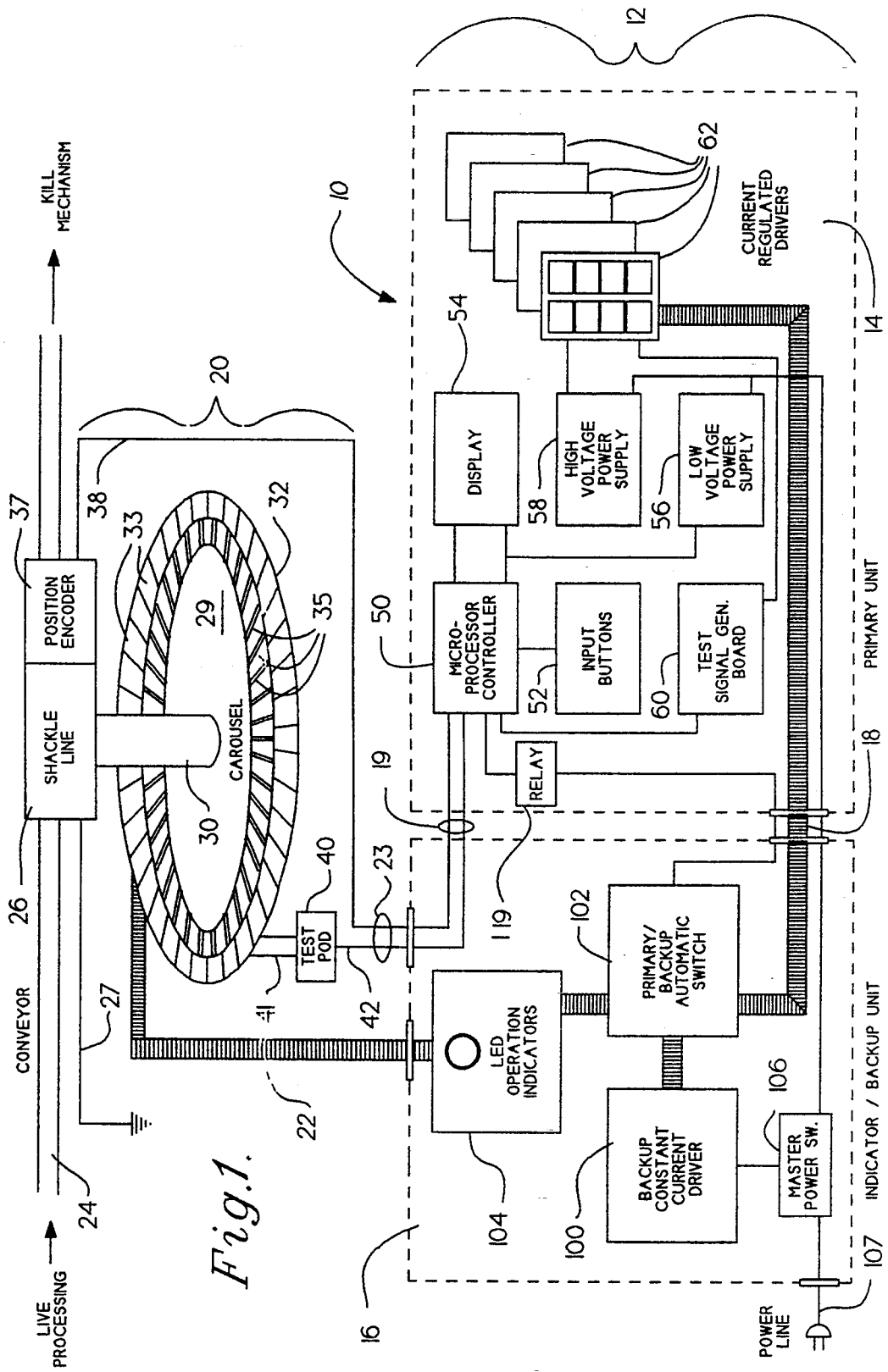
FIG. 1 is a functional diagram of one embodiment of the poultry stunning apparatus of the present invention.

FIG. 1 illustrates a functional representation of a poultry stunner, generally referred to by the numeral 10, constructed according to the teachings of the present invention. Like reference numerals are employed among the various figures to designate like elements. The present invention may be used for a broad range of stunning applications wherein the ability to deliver an individualized regulated current output to multiple independent channels is desired, including the poultry and hog processing industries. By way of example only, and not intended to be limited thereby, a preferred embodiment of the present invention will be described as it relates to the poultry industry.

More particularly and with reference to FIG. 1, there is shown a poultry stunning apparatus 10 comprising a signal generating unit 12 and a stunning unit 20. Within the signal generating unit 12 there is a primary unit 14 and a back-up unit 16 connected to each other through cable interfaces 18, 19. Operational cable interfaces 22, 23 connect the signal generating unit 12 to the stunning unit 20.

The stunning unit 20 comprises a conveyor 24 which supports a row of shackles (not shown) along the length thereof. A shackle typically is a single piece component with two loops for the bird's legs. The conveyor 24 and the shackles supported therefrom will be referred to herein as the shackle line, depicted functionally by box 26. The shackle line 26 is sometimes referred to in the art as the kill line. The shackle line 26 serves to move the poultry from the live hanging area (not shown) through the stunning unit 20 and subsequently to the kill mechanism (not shown) and the bleed out area (not shown). The shackle line 26 moves along a predetermined path at a speed consistent with the processing capability of the processing plant. In a preferred embodiment, the path of the shackle line 26 may form a portion of a circle wherein the shackle line 26 enters the stunning unit 20 at an entry angle and exits the stunning unit 20 at an angle different from the entry angle.

Each loop in the shackle is sized so as to be able to secure a broiler chicken or a turkey (not shown). Accordingly, each bird on the shackle line 26 is suspended head down from the shackle line 26 for processing. Each pair of shackles is preferably a set distance from the next pair of shackles and may, for example, be spaced at six inch intervals. According to one embodiment of the present invention, the shackles may be connected to each other and the entire shackle line 26 tied to an electrical ground 27. In that manner, the shackles serve as the ground for the stunning unit 20 described herein.

As shown in FIG. 1, the stunning unit 20 includes a carousel 29 having a vertical shaft member 30 through a center axis thereof. The carousel 29 is rotatable about the vertical shaft member 30. The shackle line 26 is coupled to the vertical shaft member 30 such that the movement of the shackle line 26 through the stunning unit 20 powers the rotational motion of the carousel 29, thereby ensuring that the carousel 29 turns at the same speed as the speed of the shackle line 26.

Supported from the carousel 29 is a basin 32 defining an area for containing a conducting liquid therein. The conducting liquid may be an electrolyte solution generally known in the art and may, for example, be a one percent saline solution. We have found that pure water also provides good results. According to a preferred embodiment of the invention, the basin 32 comprises a plurality of individualized compartments 33 which are insulated from each other such that an electrical charge applied to one compartment 33 will not electrically charge adjacent compartments 33. The individualized compartments 33 maintain a fixed position relative to the carousel 29 and each may be supported by an arm 35 on the carousel 29 wherein the arm 35 is preferably made of a conductive material. The number of individualized compartments 33 on the carousel 29 may vary depending on the size of the carousel 29. For example, forty individualized compartments 33, each angularly spaced nine degrees from the adjacent individualized compartments 33, generally is sufficient to maintain acceptable processing line throughput. In a preferred embodiment, each of the individualized compartments 33 is given a unit number, i.e., one through forty, such number serving only as an identification for that compartment 33.

The individualized compartments 33 are positioned beneath the shackle line 26 such that when a bird (not shown) is supported from a pair of shackles (not shown), its head and, optionally, its shoulders are in contact with the conducting liquid contained within the individualized compartment 33 directly beneath that pair of shackles. Because the carousel 29 and the individualized compartments 33 supported therefrom are moving at the same angular speed and along the same path through that portion of the stunning unit 20, the bird maintains contact with the conducting liquid in the individualized compartment 33 for a period of time while traveling through that portion of the stunning unit 20.

It is during that period of time, i.e., seven to ten seconds, that the stunning voltage is applied through cables 22 to the individualized compartment 33 to produce a current through the bird to the grounded shackle line 26. The voltage is applied by energizing each individualized compartment 33 individually as a function of its position. Thereafter, because of the difference between the entry angle and the exit angle of the shackle line 26, the shackle line 26 path diverges from the circular path of the individualized compartment 33 and the now stunned bird is pulled from the individualized compartment 33. Depending on the speed of the conveyor 24 line and the spacing between each pair of shackles and the spacing between successive individualized compartments 33, a plurality of birds will be at various stages of the stunning unit 20 at any given time. If there are forty individualized compartments 33, there may, for example, be twenty-six of such individualized compartments 33 having a bird therein at any one time.

Also shown in FIG. 1 is a position encoder 37 which is physically coupled to the vertical shaft member 30. The position encoder 37 may be a single turn electromagnetic transducer, for example, a DSM Series 910 Absolute Encoder available from Computer Conversions Corporation, East Northport, N.Y. Alternatively, an electro-optical position encoder 37 may be used. The position encoder 37 provides a real time output position location for each of the individualized compartments 33 at any given time. Such output position location is provided to the signal generating unit 12 for use therein through a cable 38. A reference angle is established and stored in the signal generating unit 12 when individualized compartment 33 number twelve is aligned at the center of the test pod conductive member 41. That reference angle remains the same until a realignment is performed.

There is a test pod 40 located at a constant angle with respect to the reference point. In a preferred embodiment, the test pod 40 may, for example, be positioned at one hundred eight ("108") degrees from reference angle zero. The test pod 40 comprises a conductive member 41 which comes in contact with the conductive supporting arm 35 of each individualized compartment 33. The test pod 40 further comprises a return path 42, typically through a series resistance (not shown), back to the signal generating unit 12. The conductive member 41 may, for example, be a one-half ("½") inch (1.27 cm) diameter stainless steel bar. The contact point (not shown) on the conductive supporting arm 35 is electrically isolated from the carousel 29. Thus, when the test pod 40 comes in contact with a supporting arm 35 for an individualized compartment 33, any electrical charge applied to that supporting arm 35 follows a path through the conductive member 41 of the test pod 40 and the return path 42 to the signal generating unit 12 for processing therein.

With reference to FIG. 1, the primary unit 14 of the signal generating unit 12 comprises a controller 50, an input device (keypad) 52, display 54, a low voltage power supply 56, a high voltage power supply 58, a signal generator 60, and current regulated channel driver cards 62.

Figure 2:
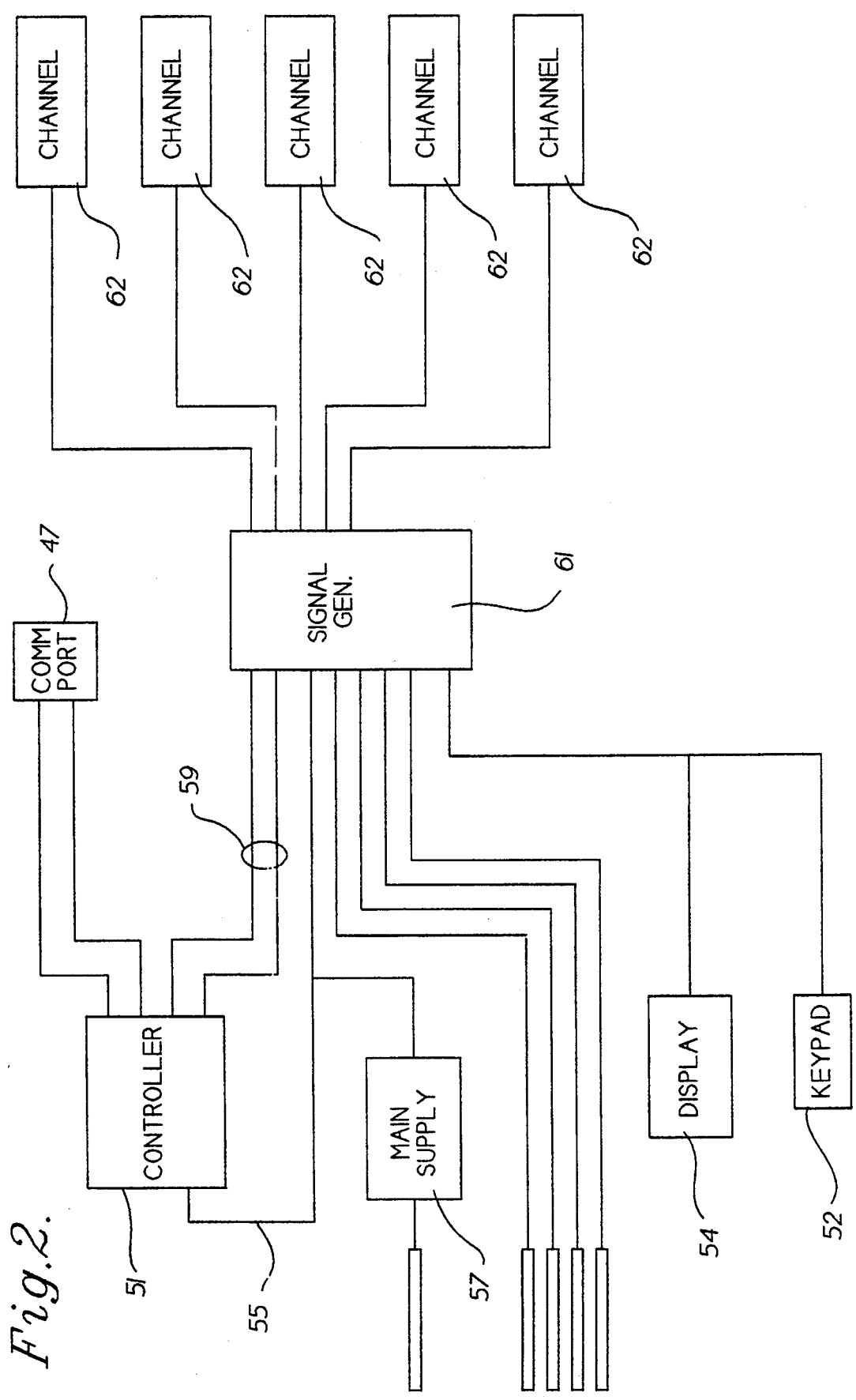
FIG. 2 is a unit level diagram of one embodiment of the primary unit of the poultry stunner apparatus.

The controller 50 preferably includes an input from the keypad 52 and drives the display 54. The controller 50 also provides an interface to the signal generator 60, an interface to the low voltage power supply 56, and an interface to the stunner unit 20. With reference to FIG. 2, there is shown a top level schematic of the components which are included in a preferred embodiment of the primary unit 14 which implement the functions and the interfaces identified in FIG. 1.

As illustrated in FIG. 2, the controller 50 is implemented using a controller board 51. The controller board 51 may be any type of microprocessor controller, and may, for example, be a Model SBS-150/H Control Computer board available from Octagon Systems Corp. The controller board 51 preferably operates on standard low level voltage which may, for example, be +5 V. The controller board 51 has a power interface 55 to a main unit supply module 57 from which it receives its operational low voltage power required. The controller board 51 receives inputs from the input keypad 52 and drives display 54. The functions of the controller board 51 are detailed in the Operational Summary contained herein.

The main unit supply module 57 may be constructed using techniques and components known in the art to provide the low voltage power supply 56 and the high voltage power supply 58 shown in FIG. 1. Preferably, the main unit supply module 57 receives as input standard 60 Hz, 110 Volt AC input and produces as DC outputs +5 V, −5 V, +12 V, −12 V, +90 V, and −90 V. Also, the main unit supply module 57 preferably supplies digital and analog grounds as well.

The signal generator 60 is implemented using a signal generator board 61. The signal generator board 61 has a control interface 59 to the controller board 51 and receives its required power through a power interface cable 65. In a preferred embodiment, the signal generator board receives as input +5 V, −5 V, +12 V, −12 V, +90 V, and −90 V and a digital ground.

The comm port 47 provides two RS-232 compatible serial ports which provide an interface to external systems. Either port may be used to perform remote diagnostics, system error alerting, software upgrades, or receive data records pertinent to the stunning process. In addition, any custom waveform or profile may be uploaded and saved thereby allowing a user to customize the apparatus for a particular application.

Figure 3:
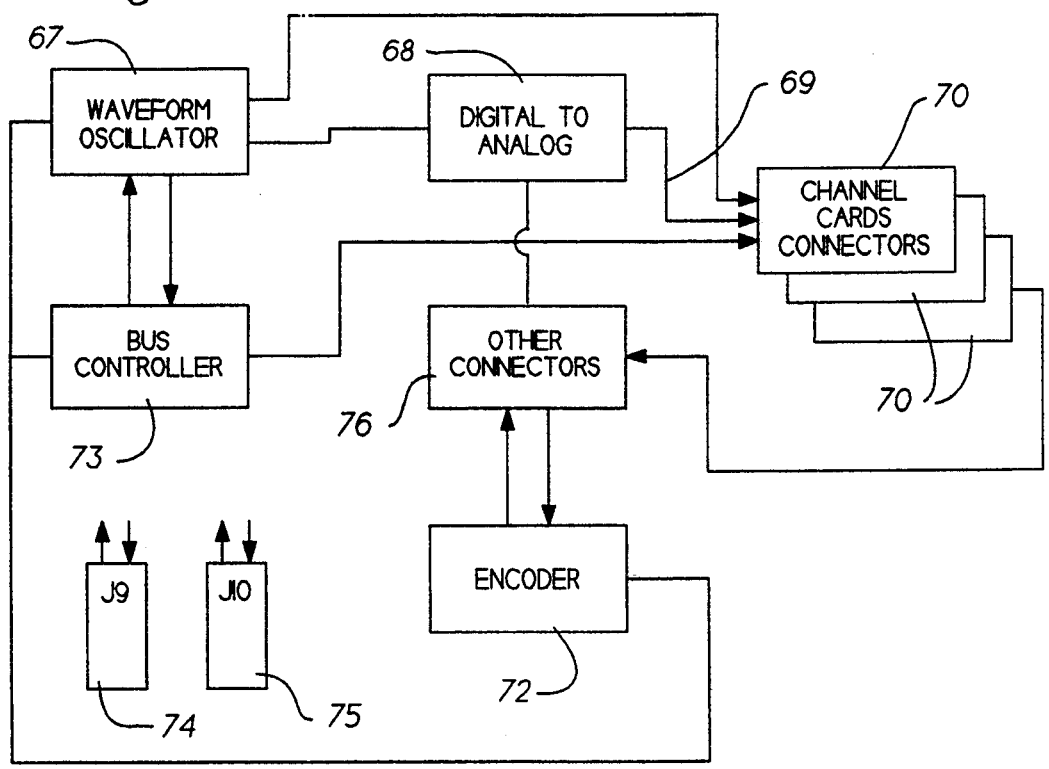
FIG. 3 is a functional block diagram of the signal generator board of the present invention shown in FIG. 2.

FIG. 3 illustrates a top level functional block diagram of the signal generator board 61. The signal generator board 61 may be constructed using components and techniques known in the art. Functionally, the signal generator board 61 includes a waveform oscillator 67 for generating a digital waveform. The waveform oscillator 67 preferably generates a variety of wave shapes, including, for example, sinusoidal, square, trapezoidal, triangular, and a pulsed DC. Any other wave shape may be loaded through the use of comm port 47. The frequency output is preferably variable and may, for example, vary from 50 to 1000 Hz.

The signal generator board 61 also provides a bus controller 73 and an encoder module function 72 for generating position data for use by the bus controller 73.

The controller board 51 in conjunction with bus controller 73 pre-loads all of the channel cards 62 with profile amplitude information based on individualized compartment 33 intended locations. In that context, a profile function means a variation of the amplitude of the waveform over time, including instantaneous on-off functions and ramp functions, either up of down. Various profiles may be entered through the comm port 47 or may be chosen from a default list, including, for example, MESA, FULL, PLATEAU, or GIBRALTER as shown in FIGS. 4A through 4D. Each of those figures show the varying amplitude of the signal with respect to time or position, position being a function of time. The profile information is stored in the individual channel RAMS (not shown) located on the channel cards 62. The output channels 85 (shown in FIG. 6) are then activated as a function of the position data received from encoder module 72 through the bus controller 73. Thus, when an individualized compartment 33 is at zero degrees and the wave profile indicates an initial ramp function for a preset time interval, the bus controller 73 would relay the address from the encoder module 72 to the output channel associated with that individualized compartment 33. That process continues throughout the intended travel distance.

The signal generator board 61 also provides a digital to analog converter 68 for generating an analog reference signal available on line 69 to be supplied through channel card connectors 70 for connection to the channel cards 62 shown in FIG. 2. The number of channel cards 62, and thus channel card connectors 70, is application dependent. As will be seen, for a forty channel output from the primary unit 14 (i.e., forty individualized compartments 33 on the carousel 29), and if eight driver circuits 82 are placed on each channel card 62, five channel cards 62 will be required.

The signal generator board 61 also provides a bus controller 73 and an encoder module function 72 for generating position data for use by the bus controller 73. The bus controller activates the output channels 85 as a function of the position data and wave profile information received from the controller 51. Thus, when a particular individualized compartment 33 is at zero degrees and the wave profile indicates an initial ramp function for a preset time interval, the bus controller activates the output channel 85 associated with that individualized compartment 33 and the waveform oscillator 67 will ramp the amplitude of the current for that preset duration. When the position data indicates that the individualized compartment 33 has traveled the distance associated with the preset time interval, the bus controller 73 will so indicate to the waveform generator 67 and a constant amplitude current output will be maintained.

The encoder 72 receives its input from position encoder 37 through path 38. The encoder module is thus able to provide a position for each individualized compartment 33 on the carousel 29 at any given time. Input and output to the controller 51 is provided through connectors J9 and J10, 74 and 75, respectively. Likewise, other connectors 76 necessary for the particular implementation are provided.

Referring again to FIG. 2, there are five channel cards 62 shown. Each channel card has an interface to the signal generator board 61 from which it gets its bus control and reference analog output signals. The channel cards 62 are constructed using components and techniques known in the art. FIG. 5 shows a top level schematic diagram for each channel card 62. As can be seen, each channel card 62 preferably contains eight drivers 80 and the logic 81 required to control those drivers 80.

Figure 6:
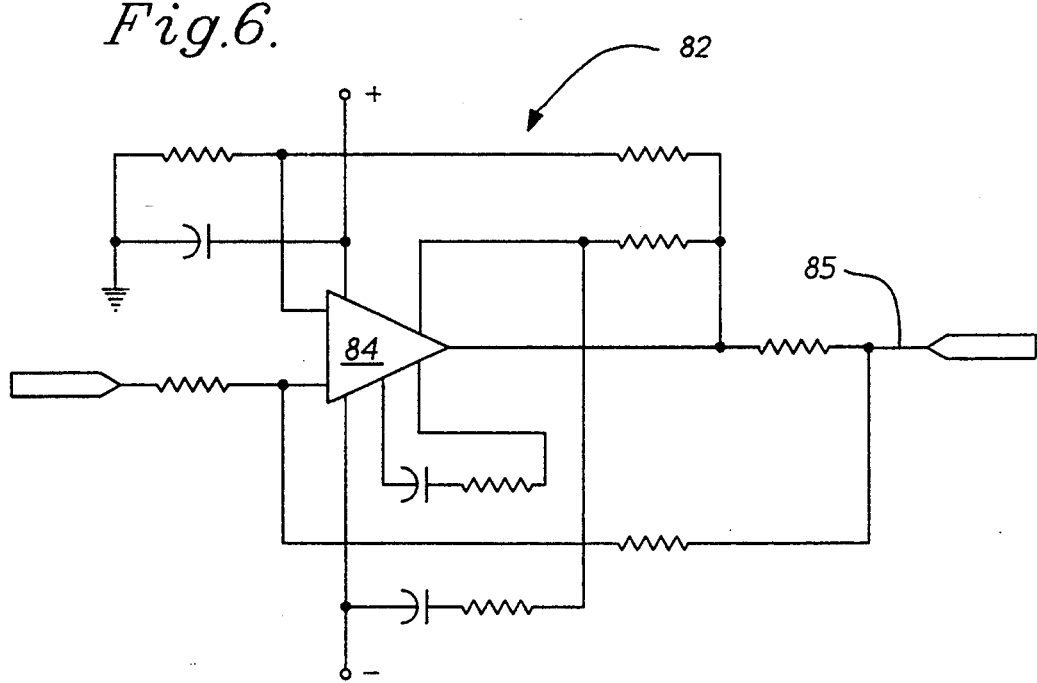
FIG. 6 is a circuit diagram for one embodiment of the channel drivers shown in FIG. 5.

A driver circuit 82 is contained within each of the drivers 80 and is generally known in the art as shown in FIG. 6. The main component of the driver circuit 82 is operational amplifier 84. The operational amplifier 84 is preferably a PA41 power op amp available from APEX Microtechnology Corp. and the circuit 82 is derived from application notes available from APEX. The operational amplifier 84 serves as a current regulator to drive a current regulated signal at the same frequency and waveform as the analog reference signal available on path 69 and at the amplitude determined by the profile as a function of position. The operational amplifier 84 serves the function of being able to respond in real time to variations of the resistance of the load by adjusting its output to drive the current regulated signal. With a total of eight driver circuits 82 per channel card 62 and with five channel cards, the signal generating unit 12 is capable of driving forty individual channels, each channel individually controlled and each output independent of the output on any of the other channels. The total number of channels may be varied depending upon the particular application.

Figure 10:
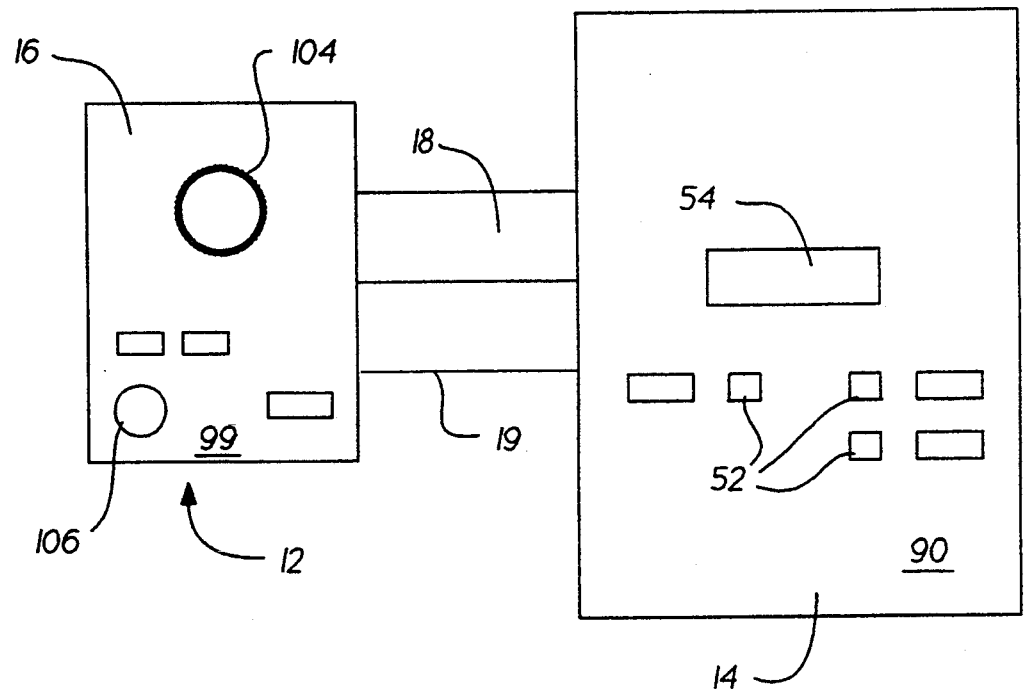
FIG. 10 is an illustration of the user interface including an arrangement of LEDs providing diagnostic information.

With reference again to FIG. 2, the display 54 is implemented using components and techniques known in the art and may be commercially available. A display unit 54 is shown in FIG. 10 as it may appear to a user on a front panel 90 of the primary unit 14. The display unit 54 may, for example, comprise two lines of twenty characters each, and may be a 2×20 vacuum florescent display available from IEE, model number S03601-95B-40.

Completing the description of the primary unit is the keypad 52, implemented using techniques and components known in the art. For example, the keypad 52 may include three function keys, shown collectively as numeral 91 in FIG. 10. The functions may, for example, be up, down and select. The keypad 52 operates in conjunction with the controller 50 and the display unit 89 to provide a menu driven user interface. The select function serves to scroll through the different options while the up and down functions change the setting. By way of example, the frequency of the output signal and the wave profile are set in that manner.

Figure 7:
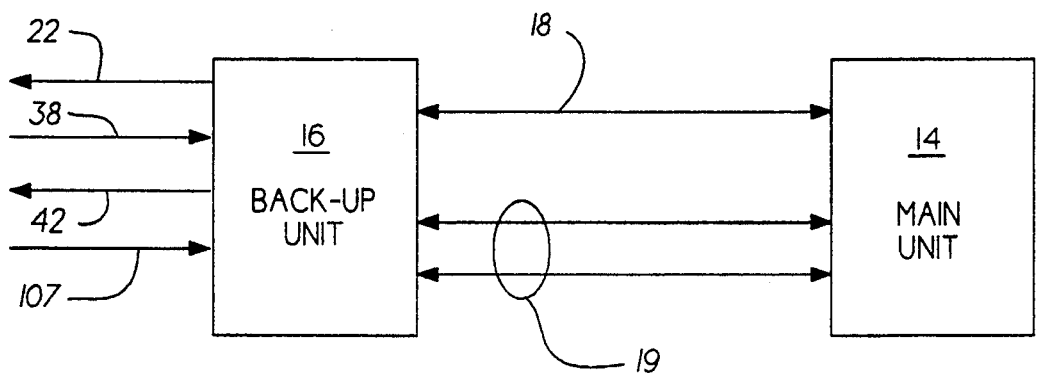
FIG. 7 is a top level diagram of the signal generating unit showing the primary and back-up unit electrical interfaces.

With reference to FIG. 1, back-up unit 16 functionally comprises a back-up constant current driver 100, primary/back-up automatic switch 102, and LED operational indicators 104. Further, there is a master power switch 106 which may, for example, be a key lock. FIG. 7 illustrates the electrical connections between the primary unit 14 and the secondary unit 16 through interface cables 18, 19 wherein interface cable 19 comprises the external relay cable 42 and an encoder cable 38. The back-up unit 16 further has a stunner cable 22, an encoder cable 38, an external relay cable 42, and a power-cable 107. The stunner cable 22 includes cables for each individualized compartment 33 and may, for example, be comprised of forty lines if there are forty individualized compartments 33. The encoder cable 38 provides the path for data from the position encoder 37 to the signal generating unit 12. The relay cable 42 provides the path for the test pod 40 to return a test current to the signal generator unit 12.

The back-up constant current driver 100 may be identical to that described for the primary unit 14 or alternatively, it may be implemented in a manner presently known in the art. The purpose of the back-up constant current driver 100 is to provide a substantially constant current on each of the individual output channels 115 in the event that the primary unit 14 fails or is otherwise taken offline.

The primary/back-up automatic switch 102 is relay driven and responsive to the controller 50 in the primary unit 14. If the controller 50 senses that any of the individualized compartments 33 fail the self-test performed at the test pod 40, the controller 50 triggers a relay 119 so that the output on each of the individual output channels within the stunner cable 22 automatically switches to the back-up constant current driver 100.

Figure 8:
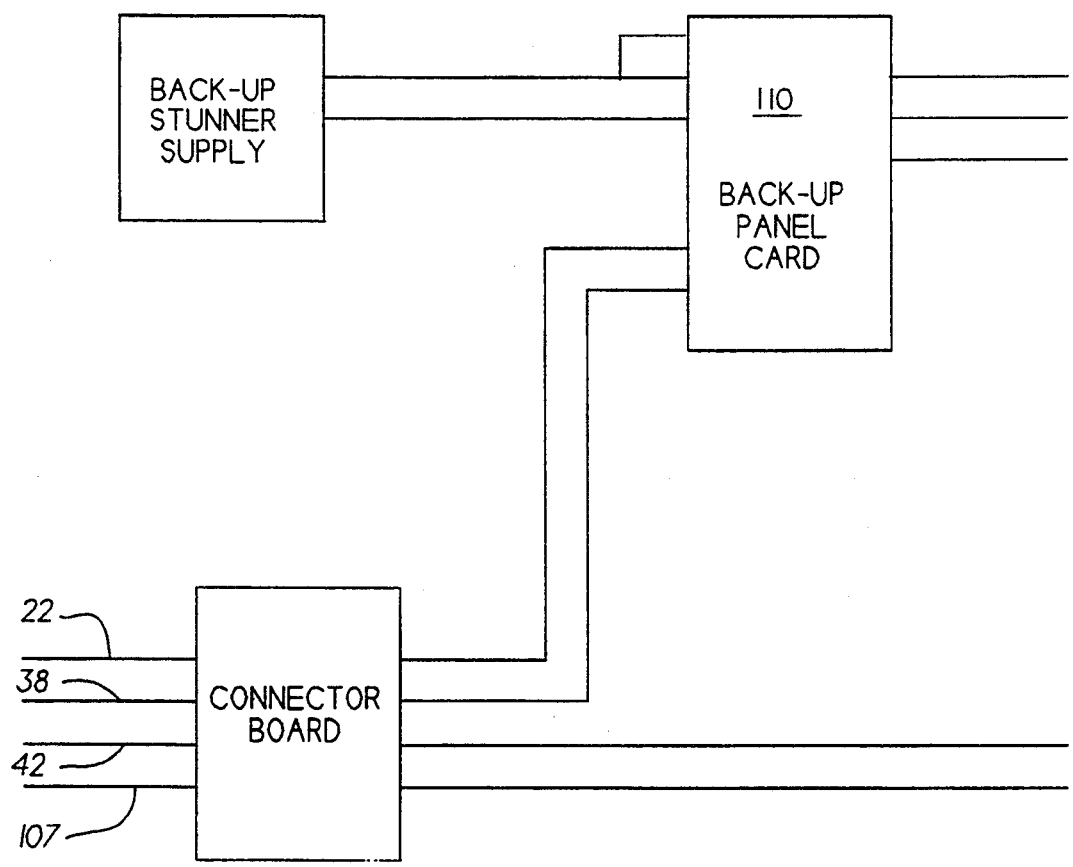
FIG. 8 is a top level schematic diagram of the back-up unit shown in FIG. 7.

FIG. 8 is a top level schematic diagram of one implementation of the back-up unit 16. The back-up unit 16 is self contained and has all necessary interfaces to the stunning unit 20 so that the primary unit 14 may be taken offline and physically uncoupled from the back-up unit 16 without impacting the processing line.

Figure 9:
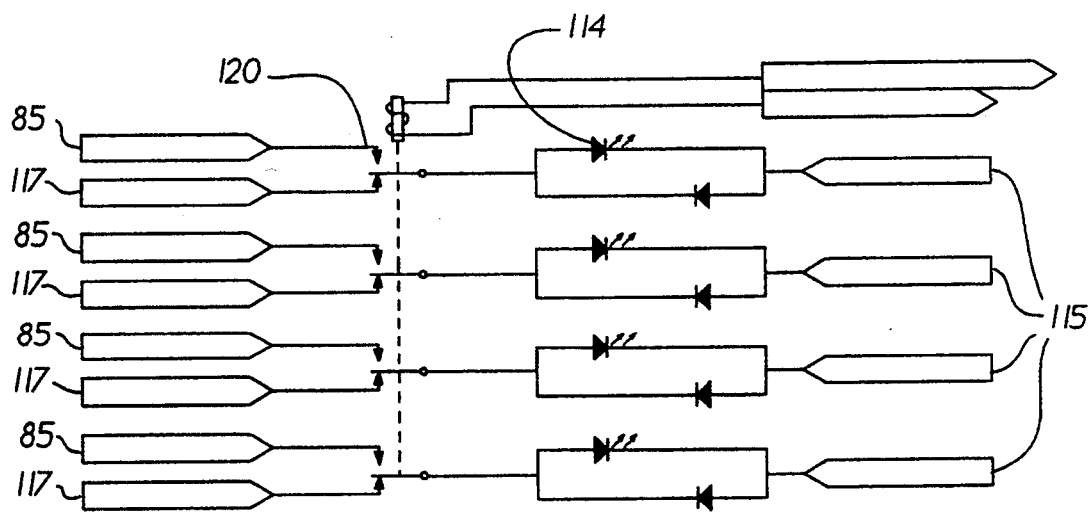
FIG. 9 is a circuit diagram for the source switch and LED display contained on the back-up panel card shown in FIG. 8.

A back-up panel card 110 houses a plurality of source switch and LED circuits 112 shown in FIG. 9. FIG. 9 is a schematic diagram of the source switch and LED circuit 112 in the back-up unit 16 of the signal generating equipment 12. It is to be understood, that each channel output 115 has an associated circuit 112 such that each channel output 115 has an LED in its path and is switchable from a primary output channel 85 to a back-up output channel 117 when relay 119 changes state and the relay contacts 120 are changed. When current is being output through output channel 115, the LED 114 in its output path is illuminated wherein the brightness of the LED 114 is a function of the current passing therethrough. Thus, each LED 114 provides a separate indicator in line with each output channel 115 and serves to indicate that the output channel 115 and associated circuitry and interconnections are operational.

In a stunning unit 20 described herein containing forty individualized compartments 33 on a carousel 29, there are forty output channels 115 and thus forty LEDs 114. The LEDs may be positioned on a front panel 99 of the back-up unit 16 in a circular pattern as shown in FIG. 10. That circular pattern provides a visual representation of the stunning apparatus 10 to the user and allows the user to monitor the operation of the stunning apparatus 10 in real time.

OPERATIONAL SUMMARY

Research commissioned in support of the development of a prototype of the present invention has found that for each voltage level applied, female broilers had a consistently higher average resistance than their male counterparts, and in fact, such average resistance differed by close to a factor of three. The gender differences provided more of a variation in resistance than weight variations, even though lighter birds were found to be generally of a higher resistance. Other factors known to affect a bird's resistance are fat thickness, access to drinking water prior to stunning, mineral content of the water in contact with the skin, skin thickness, skin wetness, and age. Further, the resistance may vary over time during the course of stunning.

Accordingly, it was determined that a preferred embodiment of the present invention should provide a constant current, after ramp-up which was variable based on the particular mix of poultry to be processed. A different steady-state current set point may be selected if processing a pen of females than if processing a pen of males. Different currents may also be set depending on any of the other factors which may affect a bird's resistance.

Steady-state constant current set point values may be set using the keypad 52 to scroll through the menu driven display unit 54. The constant current set point values may, for example, range from zero to forty milliamps. The waveshape and frequency, as well as the wave profile, are set in a similar manner (collectively hereinafter "the signal parameters").

The controller 50 provides the signal generator unit 60 signal parameters as selected by the user which are stored in memory (not shown). The signal generator unit 61 constructs the desired output signals for each of the channel outputs 85 as a function of the position at any given time of the associated individualized compartment 33 by strobing through the local memory. Thus, the output signal for each of the channel outputs may be updated every few microseconds.

The driver circuit 82 containing the operational amplifier 84 has an internal feedback path which enables the operational amplifier to continually adjust its gain so that the signal output remains at a constant current level. Again, the constant current level may be a function of the position of the individualized compartments 33, specifically if a ramp profile has been selected. In that case, the channel RAMS that are located in the driver circuit logic 81 will vary as a function of position.

Figure 11:
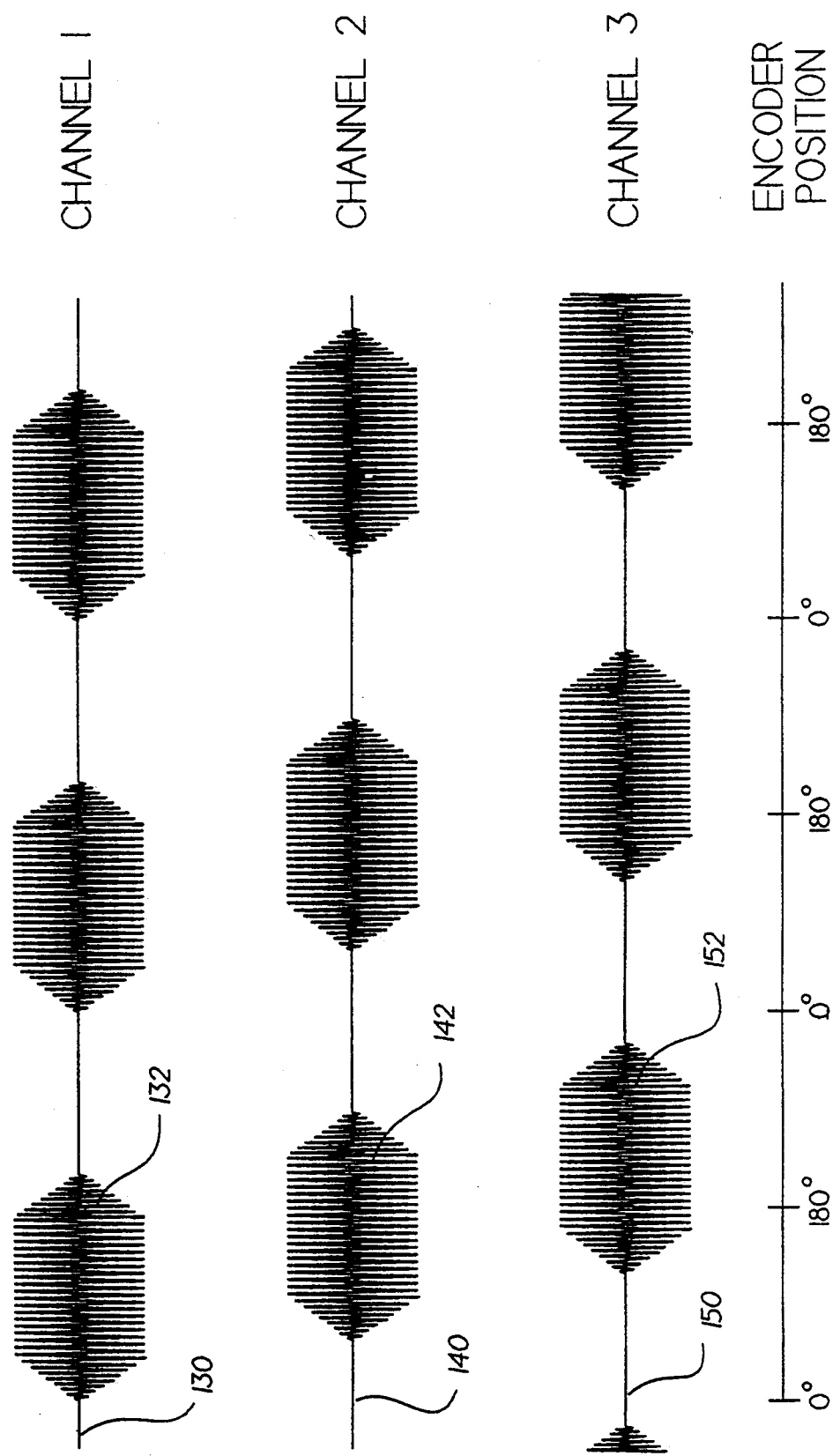
FIG. 11 is an illustration of a multichannel signal output of the present invention.

In operation, the preferred embodiment will have several birds being stunned simultaneously, each in an individualized compartment 33. The stunning current is individually controlled per compartment 33 to deliver the optimum stun to each bird. With reference to FIG. 11, there is shown an example of the output signals for three channels as a function of position. For that example, a sine waveform was chosen using a MESA profile. Channel 1 output 130 is turned on at zero degrees which, in this example, would correspond to when the first bird entered individualized bath 33 number one. The signal amplitude 132 of the sine wave is varied over time (position) to correspond to the MESA profile. Similarly, channel 2 output 140 and channel 3 output 150 each have a sine waveform whose amplitudes 142, 152 respectively, correspond to the MESA profile as a function of position, with the position skewed with respect to channel 1 output 130 and with respect to each other. Thus, each individual compartment 33, and thus each bird to be stunned, is receiving the selected current regulated signal required for an optimum stun. The individual current regulator driver circuits 82 maintain the proper amplitude, in effect, varying the voltage to maintain a regulated current as the load across the circuit is varied. As a carousel 29 is used in this example to support the individualized compartments 33, the cycle for each channel repeats at 360 degree intervals.

During each revolution of the carousel, every individualized compartment is subject to a self test at the position associated with the test pod 40. A known signal is supplied to the supporting arm 35 as it passes through the test position. The test pod 40 electrically connects to the supporting arm and the known signal is relayed back to the controller 50 where the received signal is compared to an expected value. If the results are within acceptable pass criteria, normal operation continues. If the results are outside the range of acceptable results, the relay 119 is triggered and the "hot" spare back-up unit 16 goes online.

The present invention may be varied depending on application requirements. As stated earlier, the number of individualized compartments, and thus, the number of independently controllable electrical channels, are not limited to forty and, in fact, may vary to accommodate various processing line configurations. Further, the polarity of the system may be reversed wherein individualized compartments are connected to a common ground and the shackles are electrically isolated from each other, each shackle pair then receiving the optimum stun per bird as described herein. If the polarity of the system is changed in that manner, a common bath for all birds may be used as the electrical ground.

Further, statistical functions may be added to the controller to compile data with respect to processing quantity, efficiency, and quality. Temperature sensors may be added for processing those animals whose resistance may be temperature sensitive.

ALTERNATIVE EMBODIMENTS

Figure 12:
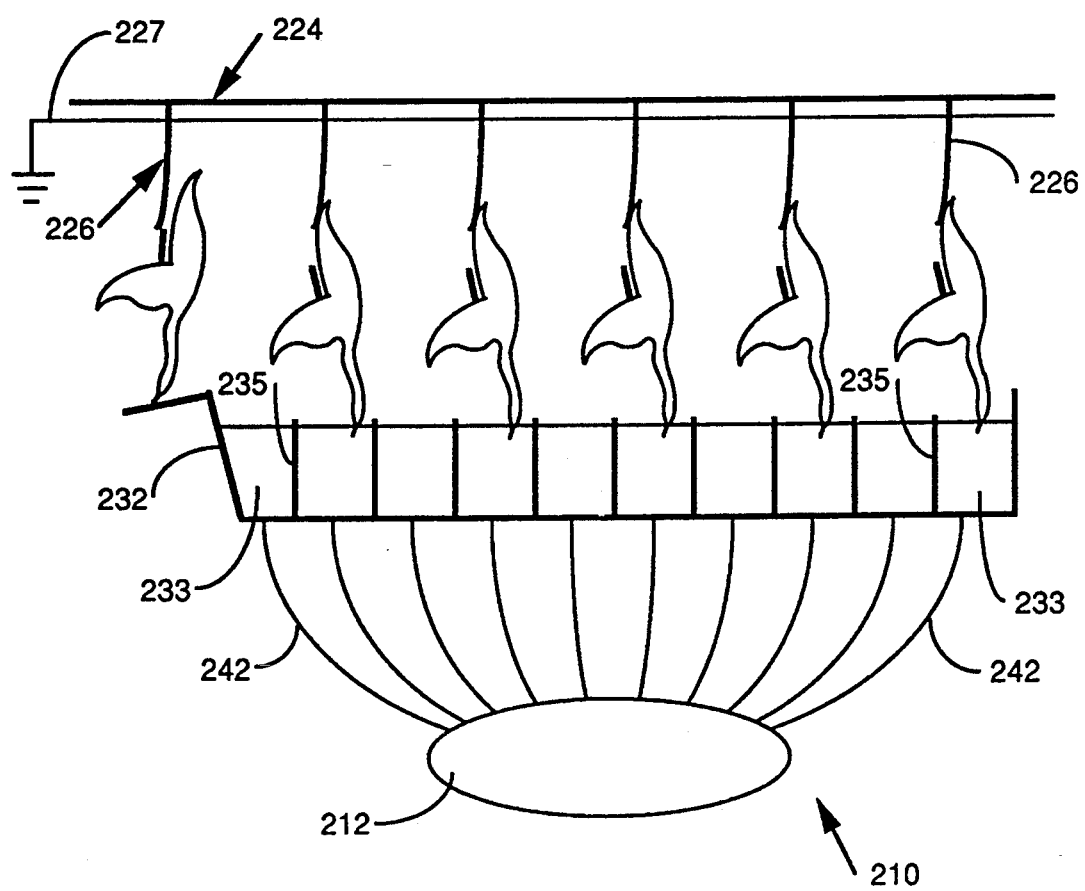
FIG. 12 is an illustration of an alternative embodiment of the present invention wherein the individual compartments are stationery relative to the conveyor.

According to another embodiment of the present invention and with reference to FIG. 12, there is shown a poultry stunning apparatus 210. The poultry stunning apparatus includes a signal generating unit 212, a partitioned basin 232, and a shackle line 224.

The shackle line 224 may be any type of shackle line which suspends poultry head down, provided that the individual shackles 226 which hold the poultry are conductive and are connected to ground potential 227.

The partitioned basin 232 contains individual compartments 233 separated by partitions 235. The individual compartments 233 are filled with a conducting liquid which may, for example, be a one percent saline solution or other type of conducting liquid known in the art. The partitions 235 serve as an insulator so that a charge applied to one of the compartments 233 will not electrically affect the adjacent compartments 233. The partitioned basin is preferably stationary relative to the shackle line 224.

The signal generating unit 212 may include a back-up and primary unit as described in the previous embodiment. The signal generating unit 212 generates a constant signal for each channel and applies that voltage to individual compartments 233 within the basin 232 through interface wires 242. The number of individual channels may vary, ten are shown in FIG. 12. In practice, the number of actual channels should be selected as a function of the speed of the shackle line 224 such that each of the poultry receives a charge for approximately seven (7) to ten (10) seconds.

In operation, the poultry is suspended by the shackles 226 and moved along with the shackle line 224 over the partitioned basin 232. The poultry is dragged along the basin 232 and makes contact with the conducting liquid within each of the individualized compartments 233 as it is being conveyed. Because each individualized compartment 233 is electrically charged, the poultry completes the electrical circuit between the conducting liquid and the grounded shackles 226 and thereby receives the stunning current.

Figure 13:
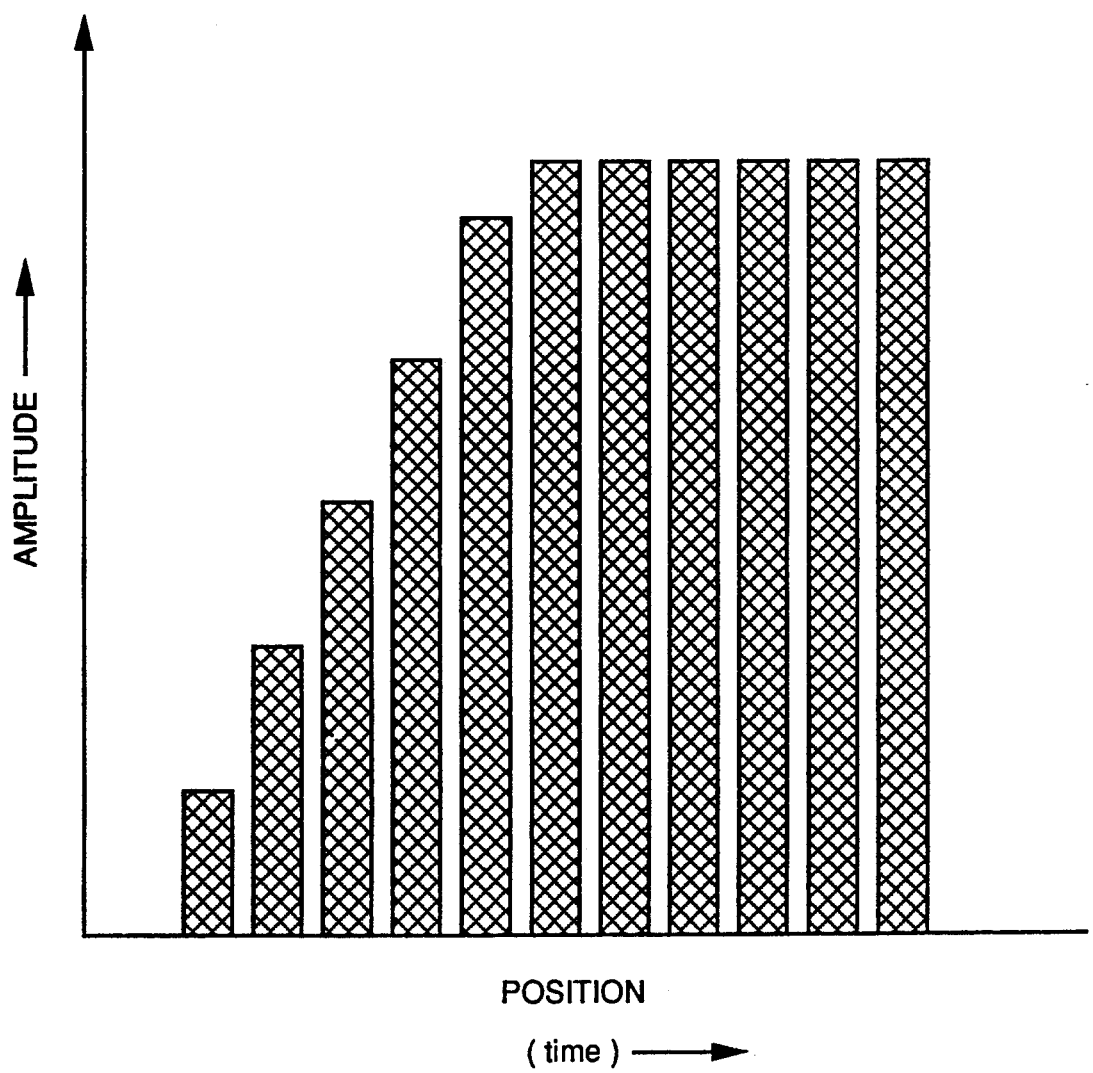
FIG. 13 is a bar graph showing the current applied to the poultry according to the embodiment shown in FIG. 12.

Because each channel is individually charged, the poultry can receive a substantially constant current during the stunning cycle according to any of the waveforms shown in FIGS. 4A through 4D, with only momentary breaks in the charges as the poultry is dragged from one compartment 233 to the next compartment 233. By charging each compartment 233 with a different level of current, pseudo wave forms approximating those of FIGS. 4A through 4D may be created. FIG. 13 shows a graph of the current as it may be applied to the bird over time according to this alternative embodiment of FIG. 12, with each bar representing a single channel to a single individual compartment 233. It is preferred that the speed of the shackle line 224 and the size of the partitions 235 be such as to minimize the amount of noncontact time, i.e., the time during which no current is being received by the poultry. As is seen, the voltages are a function of each compartment's position relative to the direction of motion of the shackle line 224.

Figure 14:
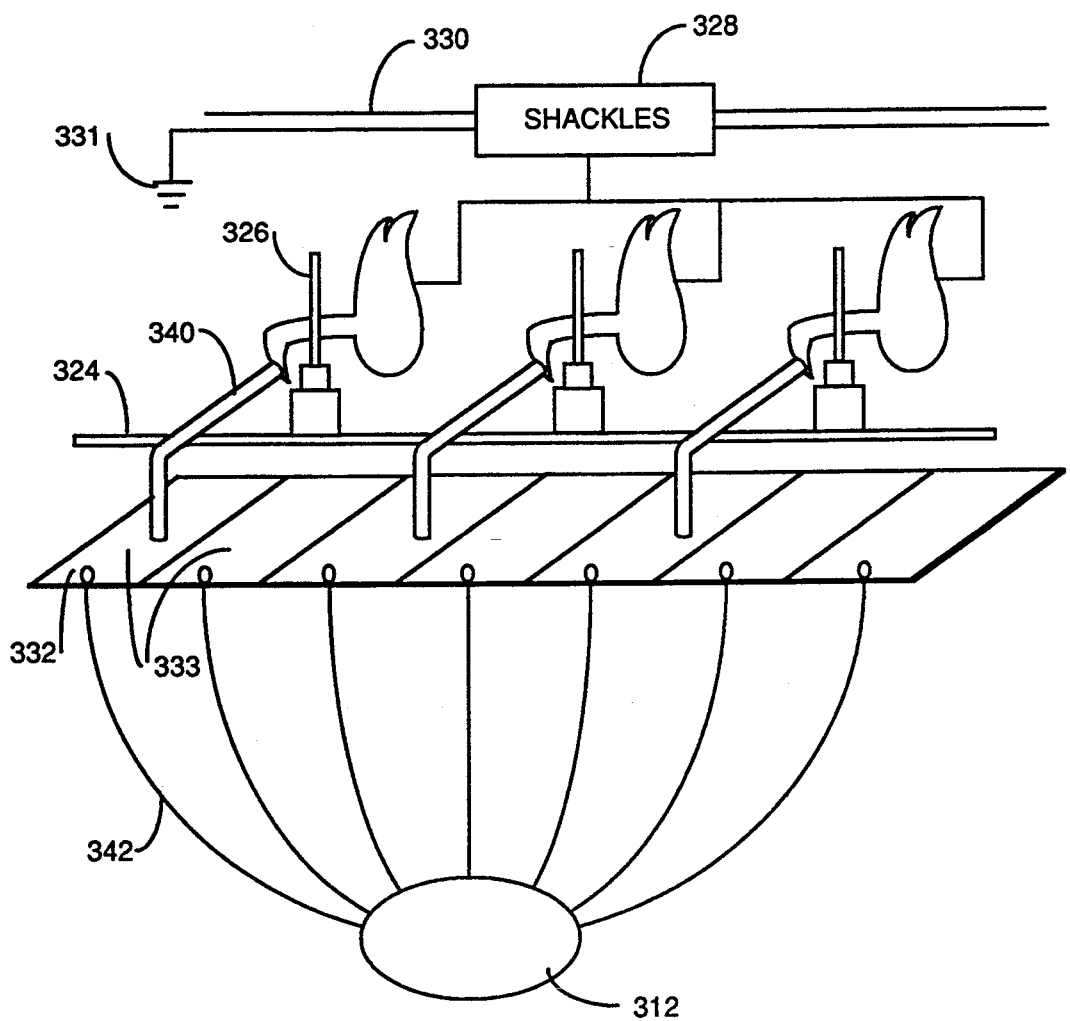
FIG. 14 is an illustration of yet another alternative embodiment of the present invention wherein the poultry is stunned using a contact sliding across a stationary conducting strip.
Figure 15:
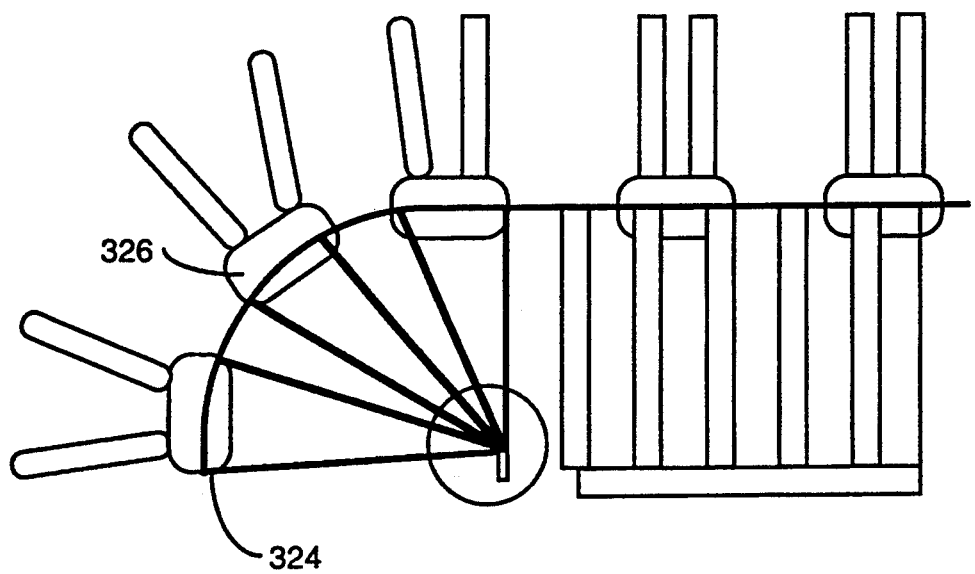
FIG. 15 is a side view of the conveyor portion of the apparatus shown in FIG. 14.
Figure 16:
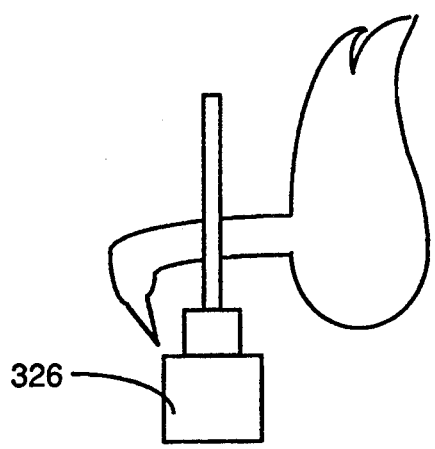
FIG. 16 is an end view of the apparatus of FIG. 14 and 15 showing the poultry as trapped.

According to another embodiment of the present invention and with reference to FIGS. 14 through 16, a commutator strip 332 comprising individually charged and electrically isolated segments 333 is shown. A conveyor line 324, which may be a modification of a kill machine as described in U.S. Pat. No. 3,571,845 dated Mar. 23, 1971, is positioned adjacent the commutator strip 332. As with the previous embodiments, a shackle line 330 having shackles, represented by box 328, suspends the poultry by the feet and moves the poultry through the processing line. The shackles 328 are connected to ground potential 331. The conveyor line 324 has scissor-like clamps 326 which close around the poultry, trapping the neck and head, as the poultry is moved by the shackle line 330. Once trapped, an electrical contact 340 is made to the poultry's head, preferably the face. The other end of the electrical contact 340 slides along the individual segments 333 of the commutator strip 332. The signal generating unit 312, which may include a primary and back-up unit, provides an individual charge to each of the segments 333 through conducting wires 342. The poultry completes the circuit between the charged segments 333 and the grounded shackles 328. Pseudo-waveforms may be formed as described above by varying the constant current charge applied to each segment 333. After the stun is complete, the electrical contacts 340 are removed and the scissor-like clamps 326 are released from the necks of the poultry.

In each of the embodiments, it is preferred that each individual bird or animal being stunned be part of an individual circuit and not part of a parallel circuit which is created by applying a single charge to multiple birds simultaneously as is currently practiced in the art. The individual circuits created by the present invention allows an optimum, constant current to be applied to each bird to achieve an effective stun.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. An apparatus for stunning animals, said apparatus comprising:
    conveyor means for suspending the animals, said conveyor means moving along a predetermined path;
    a compartmentalized basin means defining individual compartments for a conducting liquid wherein each of said individual compartments is electrically isolated from other said individual compartments, said basin means positioned below a portion of said conveyor means; and means for impressing a voltage across said conveyor means and independently each of said individual compartments, said voltages being a function of said position of each of said individual compartments relative to said conveyor means.

2. The apparatus of claim 1 wherein said means for impressing a voltage includes means for energizing individual compartments and means for grounding said conveyor means.

3. The apparatus of claim 1 wherein said means for impressing a voltage includes back-up means for supplying back-up voltages, and switching means for selecting one of said voltages and said back-up voltages to be impressed across said conveyor means and said individual compartments.

4. An apparatus for stunning animals, said apparatus comprising:
   conveyor means for suspending the animals, said conveyor means moving along a predetermined path;
   a contact strip applied to a portion of each animal,
   conducting strip means defining individual segments, said conducting strip means positioned adjacent a portion of said conveyor means such that said contact strip forms an electrical connection with said conducting strip when said conveyor means moves the animal such that said contact strip is in contact with said conducting strip; and
   means for impressing a voltage across said conveyor means and independently each of said individual segments, said voltages being a function of said position of each of said individual segments relative to said conveyor means.

5. The apparatus of claim 4 wherein said means for impressing a voltage includes means for energizing said individual segments and means for grounding said conveyor means.

6. The apparatus of claim 4 wherein said means for impressing a voltage includes back-up means for supplying back-up voltages, and switching means for selecting one of said voltages and said back-up voltages to be impressed across said conveyor means and said individual segments.

7. A method for stunning animals, comprising the steps of:
   suspending the animals from a conveyor means which moves along a predetermined path;
   positioning individual conducting means below a portion of said conveyor means;
   impressing a voltage across said conveyor means and independently each of said individual conducting means, said voltages being a function of the position of each of said individual conducting means relative to said conveyor means.

* * * * *

UNITED STATES PATENT AND TRADEMARK OFFICE
CERTIFICATE OF CORRECTION

PATENT NO. : 5,401,209
DATED : March 28, 1995
INVENTOR(S) : George J. Ripol, Samuel C. Yakulis, Forrest K. Smith, George K. Woodworth and Craig D. Peterson It is certified that error appears in the above-indentified patent and that said Letters Patent is hereby corrected as shown below:

Col. 15, line 2, after "independently",
    insert --to--.

Col. 16, line 4, after "independently",
    insert --to--.

Signed and Sealed this

Thirteenth Day of June, 1995

Attest:

BRUCE LEHMAN

Attesting Officer

Commissioner of Patents and Trademarks